United States Patent [19]

Jesse

[11] 4,109,541
[45] Aug. 29, 1978

[54] FRICTION GEAR

[76] Inventor: Gerhard Jesse, Am Bostelkerg 147, 3001 Hellendorf, Fed. Rep. of Germany

[21] Appl. No.: 686,714

[22] Filed: May 17, 1976

Related U.S. Application Data

[63] Continuation-in-part of Ser. No. 464,908, Apr. 29, 1974, abandoned.

[51] Int. Cl.² ............................................. F16H 15/08
[52] U.S. Cl. ........................................................ 74/194
[58] Field of Search .................. 74/190, 194, 199, 201, 74/796; 226/178

[56] References Cited

U.S. PATENT DOCUMENTS

| 2,951,384 | 9/1960 | Rouverol | 74/190 X |
| 3,817,112 | 6/1974 | Ramsay | 74/190 X |
| 3,875,814 | 4/1975 | Steuer | 74/194 |

*Primary Examiner*—Leonard H. Gerin
*Attorney, Agent, or Firm*—Allegretti, Newitt, Witcoff & McAndrews

[57] ABSTRACT

The friction gear disclosed includes driven and driving shafts whose rotational axes are parallel to but spaced from each other. One of the shafts has an axial bearing surface mounted on its facing end. The other shaft includes means for mounting at least two rollers that are spaced from the rotational axis of the one shaft and that bear against the axial bearing surface. While several different embodiments are disclosed, the means for mounting and aligning the rollers holds each of the rollers such that its rotational axis is directed toward and intersects a straight line which extends parallel to the rotational axes of the shaft and which lies in a plane determined by the two rotational axes of the shafts.

23 Claims, 22 Drawing Figures

FRICTION GEAR

This application is a Continuation-in-Part of Ser. No. 464,908, filed Apr. 29, 1974, now abandoned.

BACKGROUND AND SUMMARY OF THE INVENTION

The present invention relates to an improved friction gear and more particularly, to an improved friction gear which has an infinitely variable transmission ratio and which is utilized to transmit rotational movement from a driving shaft to a driven shaft.

A friction gear for transmitting rotational movement from a driving shaft to a driven shaft, with an infinitely variable transmission ratio within certain limits, is disclosed in Austrian Pat. No. 242,457. The rotational axes of the shafts in this friction gear are disposed parallel to one another. One shaft is provided with an axial bearing surface while the other shaft has rollers that are spaced from the rotational axis of the other shaft and that bear on the bearing surface of the one shaft. The rollers are driven rotatably around their axes which extend parallel to the axis of the other shaft and which all lie on a circle concentric with the axis of the other shaft. The means for mounting the rollers are driven, through toothed wheel gearings, at an angular speed which is equal to one half the angular speed of the other shaft, with their direction of rotation being opposite to direction of rotation of the other shaft. An adjustment of the transmission ratio is affected by parallel displacement of the driven and driving shafts relatively to one another. This adjustment of the transmission ratio, by parallel displacement of the shafts, is a disadvantage with this known friction gear. The need to be able to make such a parallel displacement of the shafts means that driving and driven shafts cannot be directly interconnected, but rather special means, such as additional intermediate gears, must be provided in order to make a fixed coupling between the driving and driven shafts. An additional disadvantage is that the transmission ratio is only variable within certain limits, and in fact, extends only from slow running (although not 0) through the ratio of 1:1, into fast running. A use of this known friction gear in the range of 1:0 is not possible, and in addition, reversal of the direction of rotation is also impossible. Moreover, when the transmission ratio is 1:1, the rollers are rotated *in situ*. As a result, irregular wear on the bearing surface is produced. This leads to an irregular running when transmission ratios other than 1:1 are set. Still another disadvantage of this known friction gear is that an adjustment of the transmission ratio is impossible when the shafts are not rotating because this would require movement of the rollers transversely of their running direction. This disadvantage also applies, in part, with transmission ratios which are close to 1:1.

Another prior friction gear is disclosed in U.S. Pat. No. 3,033,048. This friction gear includes driving and driven shafts whose axes are parallel but offset from one another. Axial bearing surfaces are provided in the facing ends of the shafts and are coupled to one another through a roller. This roller is mounted on a line which perpendicularly intersects the axes of the driving and driven shafts, and the rotational axis of the roller extends obliquely of this line, in the direction of the line, so that the roller always acts with its edges on the axial bearing surfaces. The driving and driven shafts are arranged fixed relatively to one another, and it is thereby necessary to accept the disadvantages which usually occur with such arrangements. In this regard, only one roller can be arranged between the axial surfaces so that the torques which can be transmitted between the shafts are limited. This disadvantage could, of course, be partly overcome by an increased expenditure, i.e., by the use of several such gears connected in parallel, but oftentimes this may not be a viable alternative.

An additional disadvantage is that, with any particular transmission ratio, the running track of the roller, or its edge, on the axial bearing surface is always the same so that local wear and groove formation occurs. Furthermore adjustment of the transmission ratio when the shafts are stationary is impossible because this would mean sliding the roller transversely of its running direction. This disadvantage is also partly applicable at slow running speeds between the roller and its bearing surface.

In the present invention, an improved friction gear, with an infinitely variable transmission ratio, is provided which overcomes the disadvantages of these prior friction gears. More specifically, the improved friction gear of the present invention comprises driving and driven shafts which are nonadjustably fixed relative to each other, which are interconnected and which have their rotational axes parallel to and spaced from one another. One of the shafts is provided with a substantially axial bearing surface on its facing end. The other shaft is provided with at least two rollers that are spaced from the rotational axis of the other shaft and that bear on the bearing surface of the one shaft. The means for mounting the rollers holds and aligns each of the rollers such that its rotational axis is always directed toward a straight line which lies in a plane determined by the two rotational axes of the shafts.

The means for mounting the rollers includes arms which couple the rollers, mounted so as to permit pivotable movement, with an axially symmetrical guiding surface. The longitudinal axis of this guiding surface is a straight line which is parallel to the axes of the shafts and which lies in the plane defined by the two rotational axes of the shafts. To vary the transmission ratio, the guiding surface is adjustable, in a plane that is defined by the two rotational axes of the shafts and that is perpendicular to the guiding surface. However, regardless of the position of guiding surface, the roller axes always intersect the longitudinal axis of the axially symmetrical guiding surface.

The axially symmetrical guiding surface, which causes the rollers to run on cycloidal tracks on the bearing surface of the one shaft, can be constructed in various ways. For example, it may form an axial, concentric groove which positively guides the roller axes, through the arms. The axially symmetrical guiding surface can also be the external cylindrical surface of a ring and the arms may or may not be held in a bearing position, against the guiding surface by springs.

As described above, several rollers may be simultaneously used with the bearing surface in the improved friction gear of the present invention so that a comparatively high torque may be transmitted. This is a particular advantage because it is thus possible to operate the improved friction gear in the vicinity of transmission ratios of 1:0 whereat slow rotational speeds occur, and whereat, in practice, relatively large torques are generally to be taken up. Thus a friction gear of the present invention can consequently be made comparatively or relatively small.

An additional advantage consists in that each roller, during each rotation, travels over a different track on the bearing surface. In other words, as the two shafts rotate relatively to one another, the tracks of the rollers do not follow the same circular path on the bearing surface whereby uniform degree of wear on the bearing surface is assured. Therefore even when the friction gear of the present invention is run a long time at one particular transmission ratio, no grooves will be formed on the bearing surface.

Another significant advantage of the improved friction gear of the present invention is the fixed, parallel arrangement of driving and driven shafts. This permits the fixed installation, without intermediate gears, of the shafts, and this can be accomplished because the means for adjusting the transmission ratio does not serve for transmitting rotational movement between the shafts. As noted above, this adjusting means comprises the axially symmetrical guiding surface which guides the arms serving for the alignment of the rollers and thus the roller axes. Moreover, since the axially symmetrical guiding surface is adjustable, as a practical matter, independently of the means for transmitting the rotational movements between the shafts, an adjustment through 0 is possible, not only theoretically, but also practically. Thus, it is possible that the friction gear of the present invention can reverse the direction of the rotational movement of the driven shaft so that the improved friction gear can also be used as a reversing gear.

Another advantageous feature of the improved friction gear of the present invention is the adjustability of the transmission ratio when the driving and driven shafts are stationary. During such an adjustment, each of the rollers merely swivel about its axis which is disposed at right-angles to the bearing surface. Such a swivelling movement is possible because of the small extent of the contact surface between the rollers and the bearing surface. Furthermore the coupling of the rollers with the axially symmetrical guide surface is yieldable so there is only minimal pre-adjustment and a swivelling of the rollers unto their track, as determined by the new transmission setting, when the driving shaft is again set in motion. In no circumstances, however, with the friction gear of the present invention, is there any displacement of the rollers transversely of their running direction during an adjustment of the transmission ratio.

Still another important advantageous feature of the improved friction gear of the present invention results from the fact that power transmission no longer takes place in the running direction of the rollers, as is the case with the friction gear described in the previously mentioned U.S. Pat. No. 3,033,048, but also takes place, quite necessarily, in a direction transverse to the running direction. This has the effect, especially when the bearing surface is soft, that a strong, positive pick-up occurs, without any clamping effect, as a result of the rollers being pressed into the bearing surface.

The guiding forces for the rollers are extremely small since the driving forces take effect radially on the pins which are rotated for guiding the rollers. The pins or journals which are used in some of the embodiments of the present invention to mount the rollers are disposed in a cylindrical element which, in turn, is mounted on the other shaft so as to be secure against rotation but displaceable axially. Furthermore, with the improved friction gear of the present invention, the ratio between running forces and rotational forces of a roller on the bearing surface is favorable, even with the most extreme transmission ratios, so that there is no problem with any abrasion, premature wear or even a binding of the gear. Thus the friction gear according to the present invention runs extremely easily and with minimal wear regardless of the transmission ratio that is set. In this regard, the pressure at which the rollers are applied to the bearing surface can be very easily controlled since the biasing of the rollers to the bearing surface is produced by means of a spring.

In another embodiment of the present invention, one of the shafts comprises two substantially axial bearing surfaces facing one another. A plurality of bearings, each including a pair of rollers, are disposed between the facing bearing surfaces and are arranged so that one roller runs on the one bearing surface and the other on the other facing bearing surface and so that the pressure-applying forces of the rollers of one pair are cancelled out. The advantage of this embodiment is that there may be a doubling of the torque that can be transmitted with only a relatively small increase in the overall size of the friction gear.

In still another embodiment of the present invention, the axes of the rollers are disposed at an inclination to the longitudinal axis of the axially symmetrical guiding surface and to relatively the bearing surface on the shaft. The rollers are bevelled and the bearing surfaces of the rollers are preferably conical. The bearing surfaces of the rollers and the bearing surface on the shaft thus largely form a bevel gear so that frictional effects due to rotation of these bearing surfaces, relatively to one another, are minimal.

Accordingly it is a primary objective of the present invention to provide an improved friction gear of the type described, wherein the rollers, with a particular transmission ratio, do not always run on the same tracks on the bearing surface, wherein the driving and driven shafts are arranged fixed relatively to one another, wherein the improved friction gear is capable of being used as a reversing gear and wherein, an adjustment in the transmission ratio can take place when the shafts are not rotating.

These and other objects and advantages of the present invention will become apparent from the following description of the preferred embodiments of the present invention described in connection with the accompanying drawings.

Figure 1:
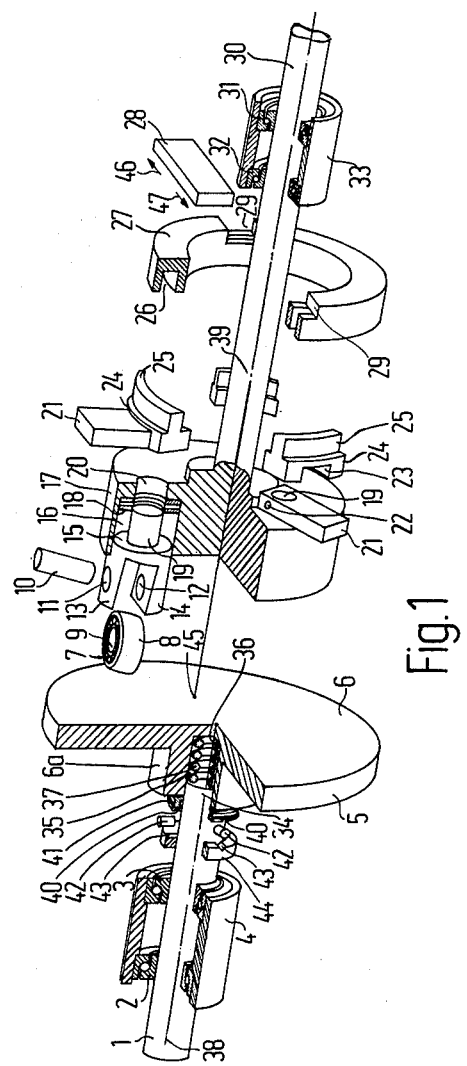
FIG. 1 shows a partial perspective exploded view of an embodiment of the improved friction gear of the present invention.

Throughout the various figures of the drawings, the same reference numerals are used to designate the same parts or components of the improved friction gear of the present invention. Moreover, when the terms "right," "left," "upper," "lower" and the like are used herein, it is to be understood that these terms have reference to the structure shown in the drawings as it would appear to a person viewing the drawings.

DESCRIPTION OF THE PREFERRED EMBODIMENT

Referring now to the embodiment of the present invention shown in FIG. 1, a shaft 1 is mounted, by means of ball-bearings 2 and 3, in a sleeve 4. The ball-bearings 2 and 3 are of the type that can resist or take up axial forces or thrust. A disc 5 is mounted and arranged on the right end of the shaft 1 for rotation with the shaft. An axial bearing surface 6 is provided on the right face of the disc 5.

A plurality of rollers 7 are arranged to run on the bearing surface 6. Since the rollers 7 are structurally and functionally identical, for simplicity only one roller 7 is shown in FIG. 1 and is described hereinafter. The roller 7 is ball bearing whose outer race 8 has a convex external surface and whose inner race 9 is held by a pin 10. The pin 10 fits into and within holes 11 and 12 in two arms 13 and 14 which together form a journal or yoke member 15. The external surface of the journal 15, including the arms 13 and 14, are cylindrical. The journal 15 is rotatably mounted in a cylindrical bore 16 formed in a cylindrical element 17. A thrust bearing 18 is also disposed in the bore 16 so as to resist or take up thrust forces.

An extension 19 is formed on the right end of the journal 15, opposite the arms 13 and 14. The extension 19 projects through a bore 20 in the cylindrical element 17 and carries, at its projecting end, an arm 21 which is fixed on the end of the extension 19 by means of a split pin or cotter 22. The arm 21 slides in an adjacent groove 23 that is formed in a semi-circular rocker arm or link 24 provided with an axially extending, arcuate projection or flange 25. The groove 23 extends radially in relation to the arcuate projection 25 which extends axially in a direction opposite to that which the groove 23 faces. The arcuate projection 25 slides in an annular groove 26 that is formed in a ring 27 and that affords an axially symmetrical rotational guiding surface for the projection 25. The ring 27 is not rotatable and is displaceable on or along a rail 28 in a direction perpendicular to the longitudinal central axis of the ring 27. The ring 27 has grooves 29 therein which are disposed in a radial direction, with respect to the ring 27, and in a plane defined by the two rotational or central longitudinal axes 38 and 39 of the shafts 1 and 30, respectively, which are offset from and parallel to one another, and to the longitudinal axis of the ring 27.

The shaft 30 is mounted, by means of ball-bearings 31 and 32, in a sleeve 33. The ball-bearings 31 and 32, like the ball-bearings 2 and 3, are of the type that can resist or take up axial forces or thrust. The direction of displacement of the ring 27 extends perpendicular to the rotational axes 38 and 39 of the shafts 1 and 30. For better illustration, the ring 27 has been shown partly in section.

At its right end 34, the shaft 1 has and guides a boss 6a which is an integral part of the disc 5 and which has, for this purpose, a bore 35 formed therein corresponding in diameter to the end 34. Disposed between the end 34 of the shaft, and the base 36 of the bore 35, a helical spring 37 biases the disc 5 to the right, as shown in FIG. 1, towards the rollers 7 so that the rollers 7 will bear, under pressure, against the bearing surface 6.

The disc 5 may serve to drive the shaft 1 by means of cooperation between a ring 41 which is attached to and rotates with the boss 6a of the disc 5 and an annular attachment 44 which is attached to and rotates with the shaft 1. The ring 41 and attachment 44 are interconnected by pins 42 which fit in the aligned, facing notches 40 and 43 formed on the ring 41 and attachment 44, respectively.

If the shaft 30 is the driven shaft, the arcuate projections 25 slide in the annular groove 26 and are guided by their axially symmetrical guiding surface, i.e., the groove 26, such that the rotational axes of the rollers 7 always extend perpendicularly of and intersect a straight line which lies in the plane defined by the rotational axes 38 and 39 of the shafts 1 and 30. The position of this straight line in this plane is capable of being altered by displacing the ring 27, with its groove 29, on and along the rail 28. Such an alteration of the position of this straight line in this plane causes a change in the speed of rotation or in the transmission ratio.

Since the rotational axes 38 and 39 of the shafts 1 and 30 are offset and parallel to one another, the rollers 7 do not run on circular tracks on the bearing surface 6 about the axis of rotation 38. Rather because of the particular guiding means utilized, the rollers 7 run along cycloidal tracks on the bearing surface 6. Thus, a driving action or force is applied to the disc 5 because of the offsetting of the rotational axes 38 and 39. The transmission ratio may be modified to such a degree that, with the shaft 30 rotating, the disc 5 and thus the shaft 1 come to a halt. In this position, the ring 27 is adjusted on its rail 28 so that the center of the annular groove 26, i.e., the longitudinal central axis of the ring 27 lies on or is co-axial with the rotational axis 39. As a result, the rotational axes of the rollers 7 are directed towards the rotational axis 39 and the rollers 7 run about a point 45 on the bearing surface 6. When the ring 27 is displaced in the direction of the arrow 46, as shown in FIG. 1, from the aforementioned rest position, the disc 5 will be increasingly driven in the same direction of rotation as the shaft 30 is rotating. However, when the ring 27 is displaced in the opposite direction, i.e., in the direction of an arrow 47, as shown in FIG. 1, the disc 5 will be driven in the opposite rotational direction. This means that, with the improved friction gear of the present invention, not not only is it possible to change the transmission ratio, but the direction of rotation may also be changed or reversed. Thus the friction gear of the present invention may be also and simultaneously be used as a reversing gear.

As will be apparent from FIG. 1, the pin 10 is arranged or disposed such that its longitudinal axis is not perpendicular to the central longitudinal axis of the journal 15, but rather is inclined at an angle to the axis of the journal 15. Thus the surface of the bearing track of the outer race 8 of the roller 7 is at an inclination relatively to the bearing surface 6 of the disc 5. In other words, the axis of the roller 7 intersects the longitudinal axis of the ring 27, i.e., the axis of symmetry of the axially symmetrical groove 26 formed in the ring 27, at an angle other than 90° and is inclined to the right with respect to a plane perpendicular to the longitudinal axis of the ring 27, as shown in FIG. 1, towards the ring 27 and away from the bearing surface 6. This arrangement results in a smaller degree of friction, and thus a smaller degree of wear, between the outer race 8 and the bearing surface 6.

Figure 2:
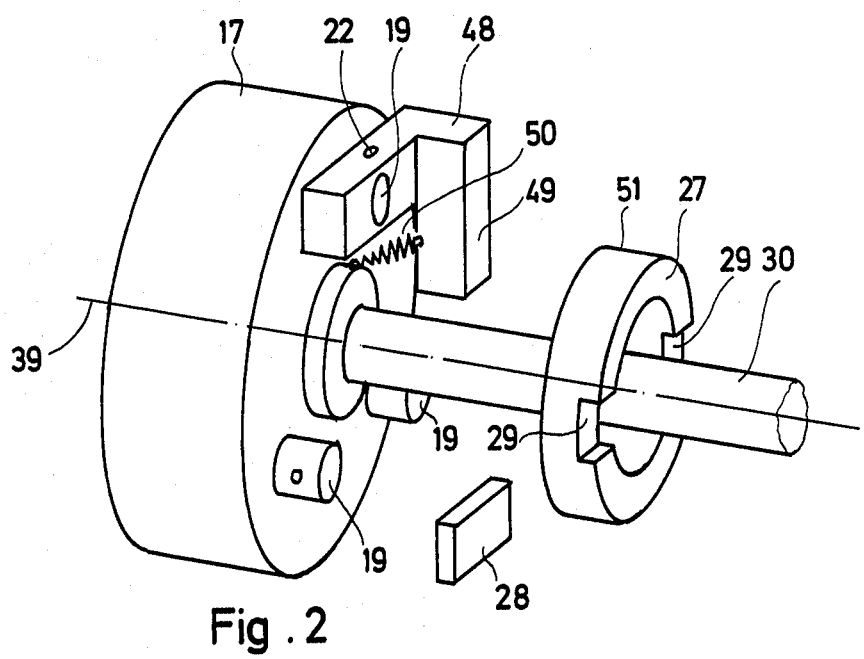
FIG. 2 is a partial perspective view showing another embodiment of the guide means for the rollers of the improved friction gear of the present invention.
Figure 3:
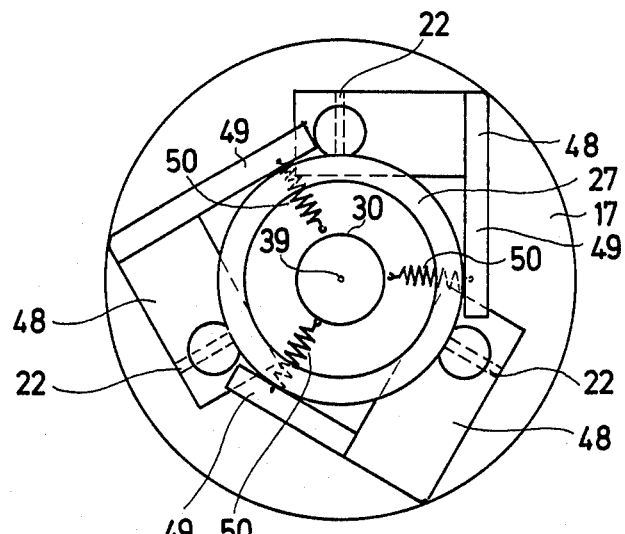
FIG. 3 is a side elevational view, as seen axially from the right, showing another embodiment of the guide means shown in FIG. 2.

Another embodiment of the means for guiding the rollers 7 is shown in FIGS. 2 and 3, and includes three angular, generally "L" shaped levers 48 mounted on the extensions 19 of the journal 15. Again since all the levers 48 are functionally and structurally identical, only one lever 48 is described herein for the sake of simplicity. The lever 48 has a bent-over end 49 which contacts and slides, under the action of the tensile force of a tension spring 50, on an outer annular guiding surface 51 formed on the ring 27. In other words, the guiding contact is not caused, in this embodiment and in contrast to the embodiment shown in FIG. 1, by positive guiding in an annular groove, such as groove 26, but rather by spring biasing the end 49 against and into bearing contact with the external guide surface 51. As shown in FIG. 3, the ring 27 lies centrally, in relation to the rotational axis 39 of the shaft 30, i.e., the ring 27 and shaft 30 are co-axial, and the ends 49 of the levers 48 bear tangentially on the external surface 51 of the ring 27.

Figure 3A:
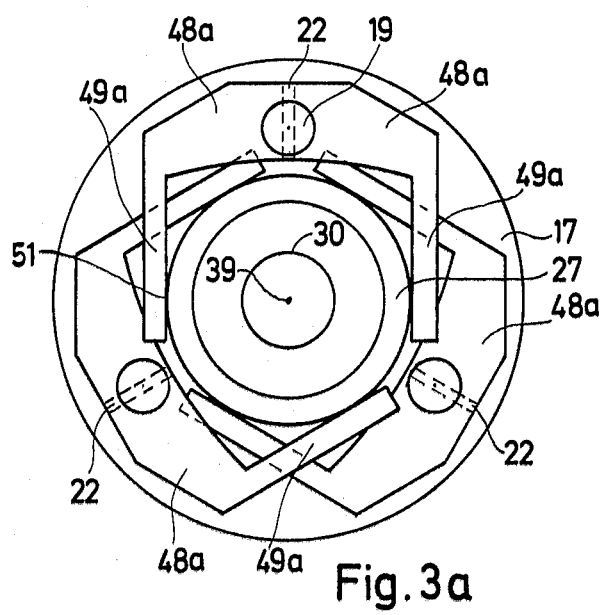
FIG. 3a is a side elevational view, similar to that of FIG. 3, of still another embodiment of the guide means.

FIG. 3a illustrates a modification of the embodiment shown in FIGS. 2 and 3, wherein the three levers 48a are shown. Like the levers 48, all the levers 48a are functionally and structurally identical and for this reason only one such lever 48a is described herein. The lever 48a is generally "U" shaped, with two ends 49a, rather than being generally "L" shaped, with one end 49, as were the levers 48. The two ends 49a bear on the guide surface 51 at two diametrically opposite joints. Thus the guiding is affected in a positive manner, as with the embodiment shown in FIG. 1.

Figure 4:
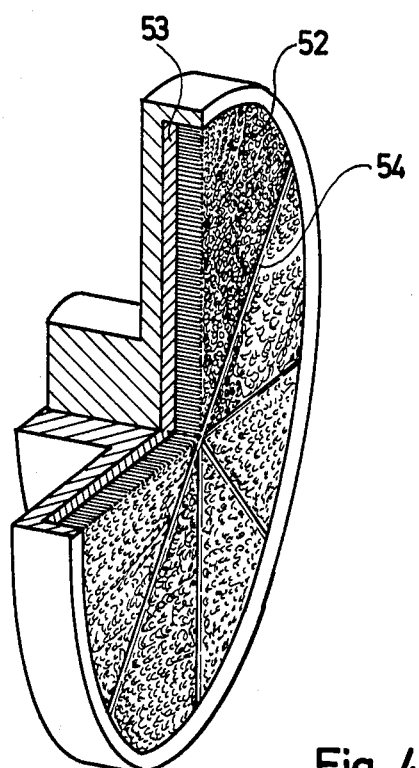
FIG. 4 is a perspective view of another embodiment of the bearing surface for the improved friction gear of the present invention.

FIG. 4 shows another embodiment of the bearing surface 6 of disc 5 which, as noted above, is mounted on the right end of the shaft 1. In this embodiment the bearing surface 6 consists of a plurality of small pins 52, arranged in close juxtaposition on a supporting layer 53 of rubber. These pins 52 are axially aligned generally parallel to the axis 38 of the shaft 1 and are disposed in segmental chambers formed between webs 54. The pins 52 can be displaced axially, i.e., pressed into the rubber supporting layer 53, and are thus able to yield axially under the pressure of the rollers 7. In this way, the outer races 8 of the rollers 7 may be positively coupled with the bearing surface 6 thereby permitting relatively high torques to be transmitted.

Figure 5:
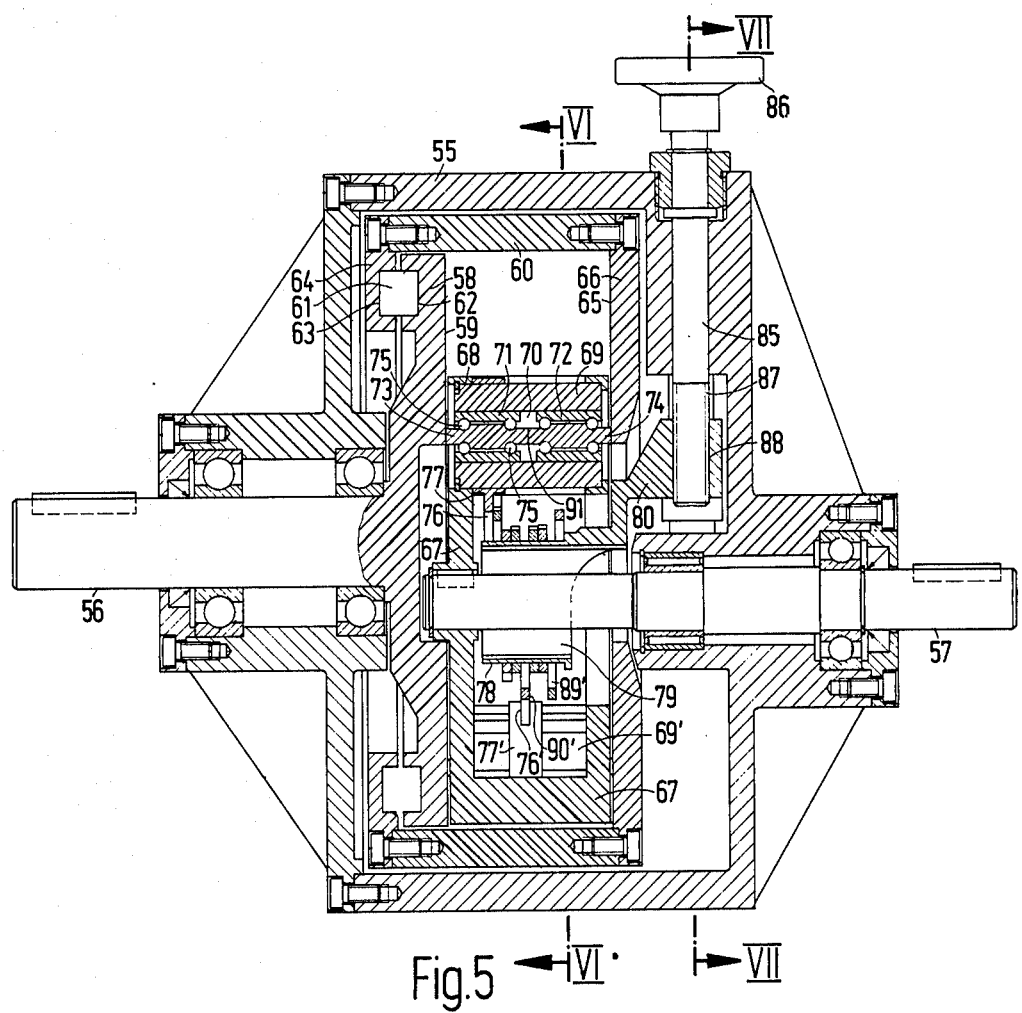
FIG. 5 is a vertical, axial cross-sectional view of another embodiment of the improved friction gear of the present invention.
Figure 6:
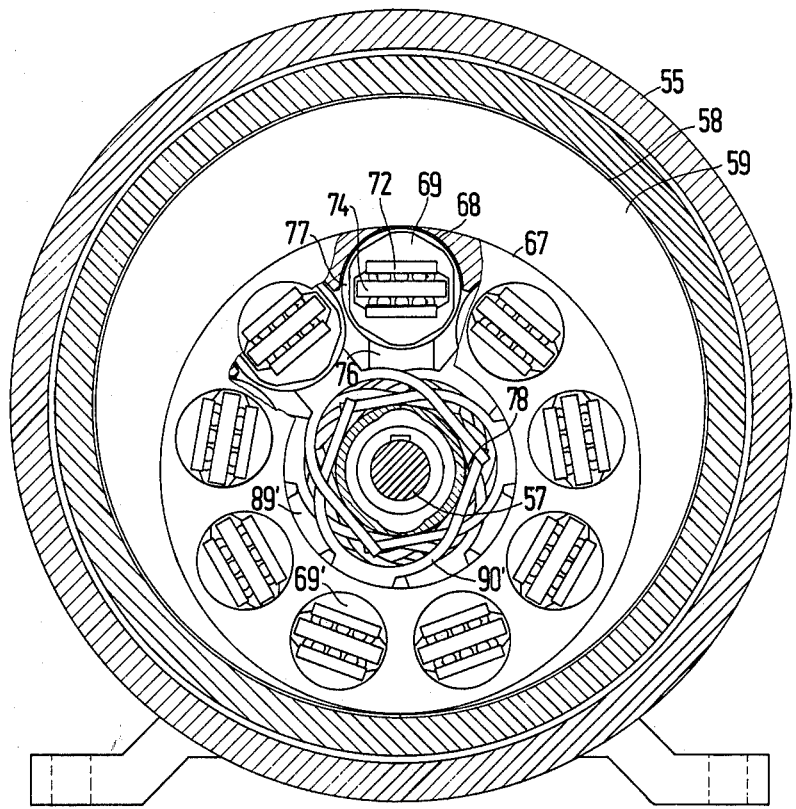
FIG. 6 is a cross-sectional view taken along the line VI—VI of FIG. 5.
Figure 7:
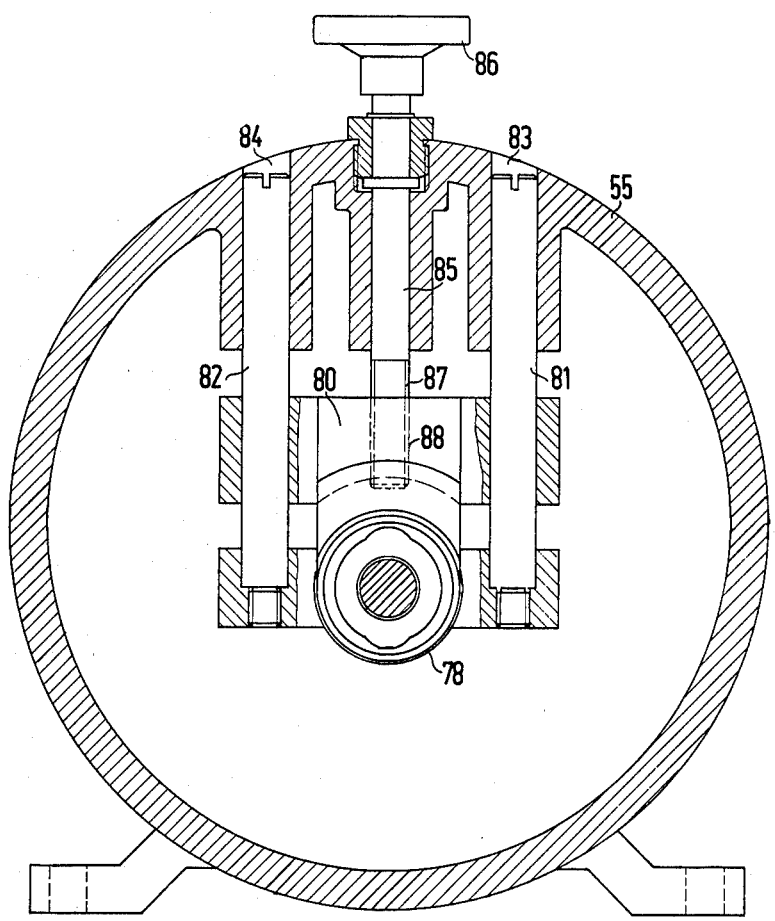
FIG. 7 is a cross-sectional view taken along the line VII—VII of FIG. 5.

FIGS. 5, 6, and 7 show still another embodiment of the present invention wherein two friction gears, such as shown in FIG. 1, are connected in parallel. There are, however, some constructional and functional differences so that this embodiment is more than just a simple combination or connection of two such friction gears in parallel. In this embodiment, a shaft 56 and a shaft 57 are mounted, by means of ball-bearings, parallel to but vertically, radially offset from one another in a housing 55. In other words, the center lines or longitudinal axes of the shafts 56 and 57 are parallel but are vertically spaced from each other.

A disc 58, with a bearing surface 59 is mounted on the end of the shaft 56 and rotates with the shaft 56. The disc 58 serves to guide a cylindrical part 60 and is coupled to the latter through a plurality of rollers 61 which are disposed and engage, on one side, in an annular groove 62 formed on the disc 58 and on the other side, in a groove 63 of a ring 64. Formed in the grooves 62 and 63 are shoulders (not shown in FIG. 5) which have opposite inclinations and on which the rollers 61 run up as a result of a relative movement between the disc 58 and the ring 64. With the torques which are operative on the bearing surface 59, the bearing surface 59 is thus moved towards a facing bearing surface 65 of a disc 66.

A cylindrical member 67 is mounted on and adjacent to the left end of the shaft 57 and rotates with the shaft 57. The cylindrical member 67 is made in the form of a boss and includes nine bores 68 arranged in a circle about and coaxial with the shaft 57. Journals 69 are rotatably mounted in these bores 68. Guide holes 70 are formed in the journals 69 and are rectangular in cross-section. Bearings 71 and 72 are disposed in the guide holes 70 and are guided thereby so that they are able to move in a direction parallel to the shaft 57, but are unable to rotate with respect to the journal 69. The rollers 71 and 72 include rollers 73 and 74 and these rollers 73 and 74 are rotatably mounted in the bearings 71 and 72, respectively, by means of a plurality of ball-bearings 75 disposed between the rollers 73 and 74 and the bearings 71 and 72 so that the rollers 73 and 74 rotate in a plane generally parallel to the shaft 57.

As shown, each journal 69 is connected with an arm 76 so as to rotate positively therewith. More specifically and as best shown in FIG. 6, the external surface of each journal 69 has six flats formed thereon. The hub 77 of the arm 76 has a bore which is complimentary to the external surface of the journal 69, and the hub 77 is pushed onto the journal 69.

The inner end of the arm 76 is formed as a fork which fits about or around an axially symmetrical guiding surface 78 formed on the outer cylindrical periphery of a tubular part 79. The tubular part 79 is held by a part 80 which, as can be best seen in FIG. 7, includes guide pins 81 and 82 mounted to be displaceable vertically in guide holes 83 and 84 of the housing 55 so that the axially symmetrical guiding surface 78 may be adjustably moved up and down vertically with respect to the shaft 57. The tubular part 79 is, however, mounted so that at all times its center line or central longitudinal axis is and remains parallel to the center line or central longitudinal axis of the shaft 57, and thus to center line or central longitudinal axis of the shaft 56. The adjustment of the part 79 is effected by means of a spindle 85 which is rotatable by means of a hand wheel 86 and which engages, by means of a screwthread 87, a threaded hole 88 in the part 80.

As will also be explained in association with FIG. 6 and as noted above, nine bores 68, with inserts consisting of the parts 69 to 74, are arranged in the cylindrical member 67. All nine inserts are structurally and functionally substantially identical except as hereinafter noted. Two such inserts can be seen in FIG. 5. The insert in the lower portion of FIG. 5 includes a journal 69', on which a hub 77' of is pushed. The other forked end 90' an arm 76' of the arm 76' engages and fits around the cylindrical guiding surface 78. As shown in FIGS. 5 and 6, another forked end 89' of one of the arms 76 is disposed on the tubular part 79 behind the end 90'. In other words, the forked ends of the arms are disposed on or about the part 79 in an aligned arrangement along the part 79.

FIG. 6 best illustrates the nine arrangements of the parts 68 to 76 that are uniformly distributed and mounted, about a circle, concentric with the shaft 57, in the cylindrical element 67. These arrangements only differ from one another by the fact that, as will be seen from FIGS. 5 and 6, their arms 76 are spaced or staggered axially of and along the guiding surface 78 of the part 78 and thus the shaft 57. As a result, their forked ends or forks 89 and 90 are all able independently to engage with and around the axially symmetrical guiding surface 78 whereby the rollers 73 and 74 have their rotational axes always directed towards the longitudinal axis of the axially symmetrical guiding surface 78.

As the nine rollers 73 and 74 move about the longitudinal axis of the guiding surface 78, the axes of the rollers 73 and 74 (the rollers 73 are disposed behind the visible rollers 74 in FIG. 6) have, in part, a nonradial position, in relation to the shaft 56, and thus also to the rotational axis of the disc 58 which as noted above, is fixed on the shaft 56 and which has the bearing surface 59, illustrated in FIG. 6, so that these rollers 73 carry the disc 58 with them. In the instantaneous position, shown in FIG. 6, the axis of the upper roller 73 does, however, have a radial direction, in relation to the shaft 56, so that this upper roller 73 does not exert any driving action on the disc 58. The nine rollers 74 cooperate in the same manner with the bearing surface 65 of the disc 66 so that the foregoing comments also apply in respect of these parts.

The embodiment illustrated in FIGS. 5 to 7 makes possible the manufacture of improved friction gears having particularly small overall sizes and with a relatively large number of friction transmission elements, i.e., rollers. Altogether in the embodiment shown, eighteen rollers 73 and 74 are provided. In addition, the bearings used for the shafts 56 and 57 are free from the pressure-applying forces of the rollers. Furthermore, the bearings 71, 72 and 75 which are used to support the rollers 73 and 74 are also not loaded with the pressure-applying forces since the rollers 73 and 74 are supported, with a line of contact 91 therebetween, so that the pressure-applying forces are cancelled out. In other respects, the same advantages are applicable to this embodiment as for the embodiments shown in FIGS. 1 to 3a.

Figure 8:
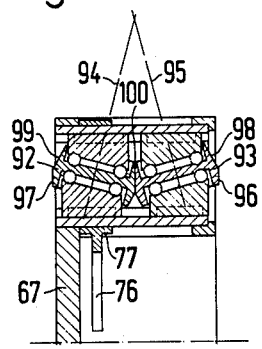
FIG. 8 is a partial cross-sectional, enlarged view of modified bearings that may be used with the embodiment of the present invention shown in FIG. 5.
Figure 9:
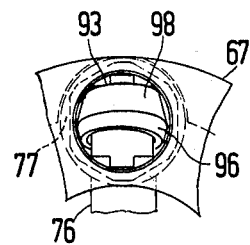
FIG. 9 is an elevational view as seen from the right, of the bearings shown in FIG. 8.

FIGS. 8 and 9 illustrate a detail of a modification of the embodiment illustrated in FIGS. 5–7 wherein rollers 92 and 93 are disposed at an inclination to the bearing surfaces 59 and 65. More specifically, the rotational axis, indicated by the broken line 94, of the roller 92 is inclined such that it forms an angle with the plane of the bearing surface 59 adjacent to the shaft 57. Similarly, the rotational axis, indicated by the broken line 95 of the roller 93 is inclined such that it forms an angle with the plane of the bearing surface 65 adjacent to the shaft 57. The rollers 92 and 93 are bevelled, and their bearing surfaces 96 and 97 are conically formed so that a linear bearing is obtained with respect to the surfaces 59 and 65, respectively. In a corresponding manner, the bearing surfaces 98 and 99 are made conical, in the reverse direction, so that the two bearing surfaces 98 and 99 contact one another along or on a contact line 100. The bearing surfaces 96 and 97 are smaller than the bearing surfaces 98 and 99 so that undesirable frictional effects of the bearing surfaces 96 and 97 on the bearing surfaces 59 and 65 are kept small. The specific pressure in the region of the contact line 100 is kept small because of the enlarged bearing surfaces 98 and 99.

FIGS. 10–21 illustrate a cycle of operation of a simplified version of the embodiment of my invention shown in FIGS. 5–9. In this regard, FIGS. 10–13 illustrate a cycle of operation, through one 360° rotation of the member 67, when the center line 78a of the guiding surface 78 is coaxial with the center line 57a of the shaft 57. FIGS. 14–17 illustrate a cycle of operation, through one 360° rotation of the member 67, when the center line 78a of the guiding surface 78 is disposed between the center lines 56a and 57a of the shafts 56 and 57, respectively, and in a plane defined by the center lines 56a and 57a. FIGS. 18–21 illustrate a cycle of operation, through one 360° rotation of the member 67, when the center line 78a of the guiding surface 78 is disposed beyond (i.e. not between) the center lines 56a and 57a and in a plane defined by the center lines 56a and 57a.

Figure 10:
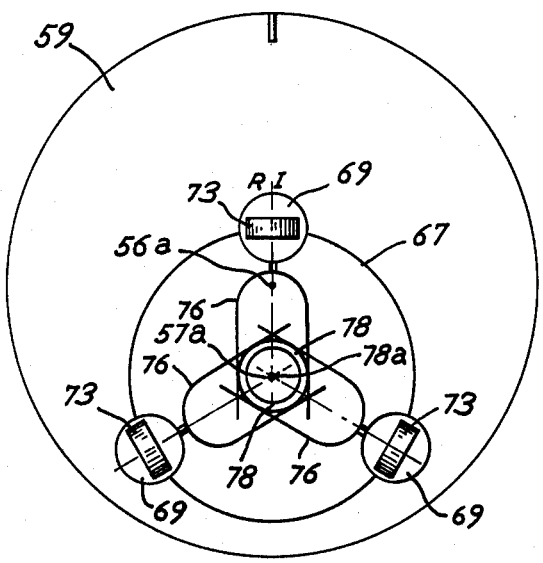
FIGS. 10–13 illustrate a cycle of operation of a greatly simplified version of the improved friction gear of the present invention when the guiding surface is disposed in a first position.
Figure 11:
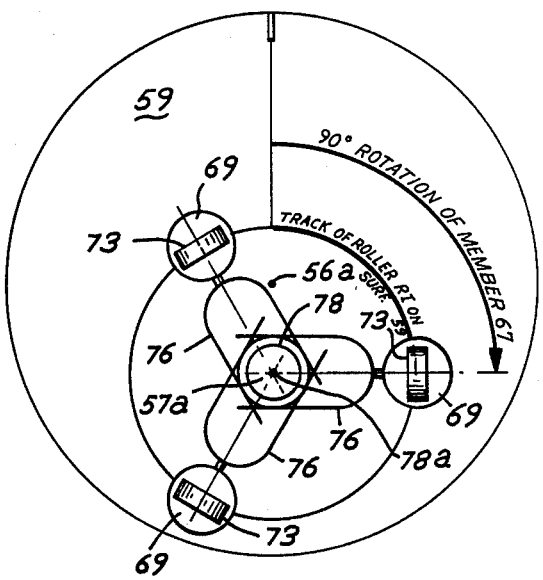
Figure 12:
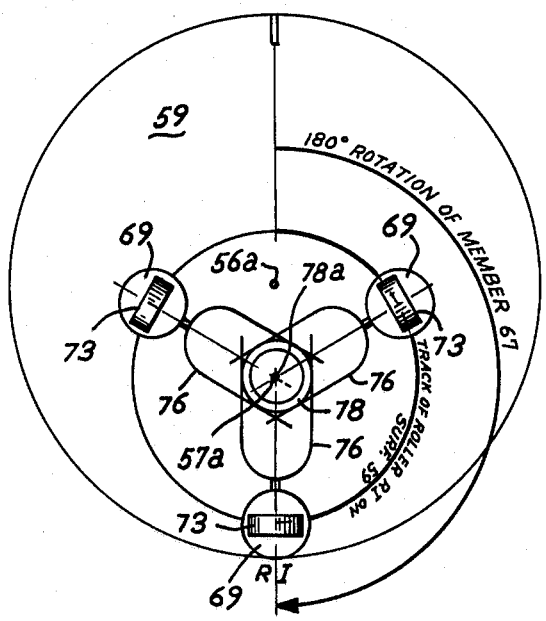
Figure 13:
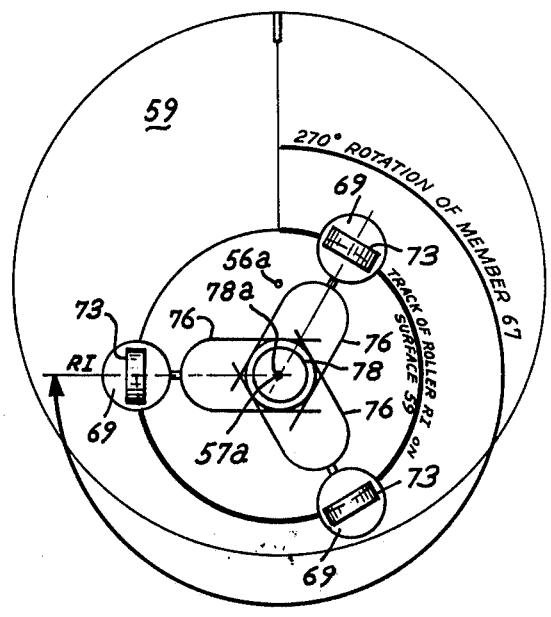

More specifically, FIG. 10 shows a simplified version of the FIGS. 5–9 embodiment wherein only three rollers, and not nine, are shown. FIGS. 10–13 show the position of vital parts or components of the friction gear at one revolution of the driving shaft 57, i.e., one revolution of part 67. The center line, 78a, of the guiding surface 78, hence the tubular part 79, is at the same position as the center line, 57a, of the shaft 57. The arms 76 will positively guide the rollers 73 in such a way that the rollers 73 will always circulate around the center line 78a of the surface 78. The ratio, as shown in FIGS. 10–13, will be 1:0. FIG. 10 shows the position of the components at the start of the cycle. FIG. 11 shows their position after 90° of rotation of part 67. All three rollers 73 have moved on circles around the center line 78a of the tubular surface 78. No motion of the surface 59 has occured. FIG. 12 shows the position of the components after 180° of rotation of part 67. Still no motion of surface 59 has occured. In summary, FIGS. 10–13 show, therefore, that when the center line 78a coincides with the center line 57a of the shaft 57, rotation of the member 67 will not result in any angular movement of surface 59. Therefore a ratio of 1:0 exists. Although no motion of the surface 59 is existing, the disc 58 will be positively fixed. Torque applied to shaft 56 will lead to no angular movement of surface 59 because the applied torque will be counterheld from the rollers 73 which are running eccentrically with respect to the center line 56a of the shaft 56. The rollers 73 will prescribe circles on surface 59.

Figure 14:
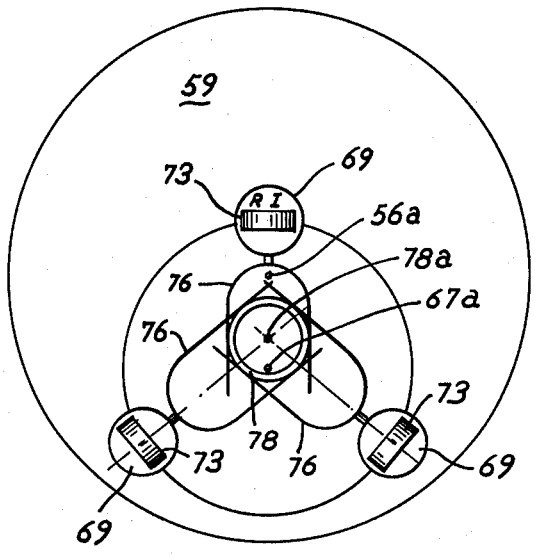
FIGS. 14–17 illustrate a cycle of operation of a greatly simplified version of the improved friction gear of the present invention when the guiding surface is disposed in a second position.
Figure 15:
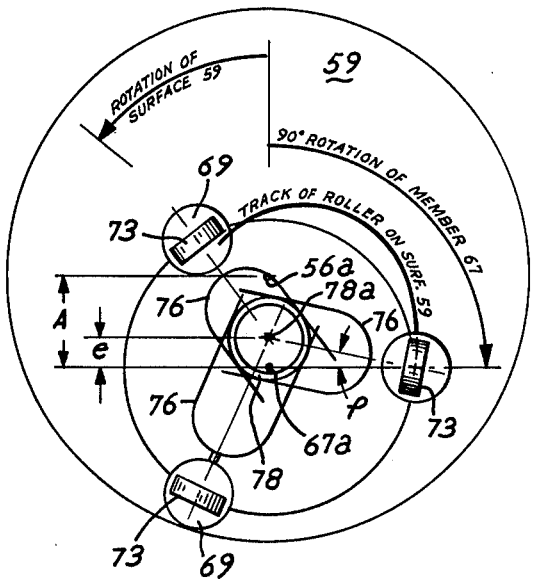
Figure 16:
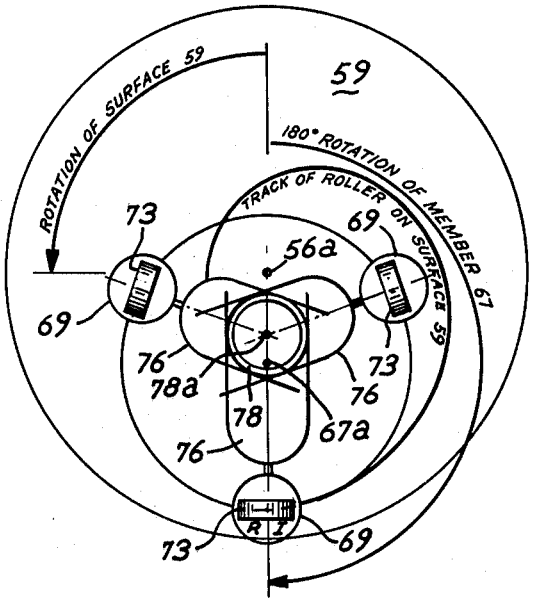

FIGS. 14–17 illustrate the one circle of operation through one revolution of member 67 when the guiding surface 78 is being shifted towards the center line 56a of shaft 56, i.e., the center line 78a of the surface 78 is positioned between the center lines 56a and 57a of shaft 56 and 57, respectively. FIG. 14 shows the position of the components at the start of the cycle. FIG. 15 shows the position of the components after 90° of rotation of the member 67. In this regard, it is important to note that the arms 76 do guide the rollers 73 positively in such a way that the center of curvature of the tracks, which the rollers 73 are describing on surface 59, are always identical with the center line 78a of the tubular surface 78. It can be seen from FIG. 15 that the roll RI has now an angle of inclination (or better angle of swivel) which is called $\phi$ As a consequence of this fact, a component of motion of the roll RI will cause the surface 59 to rotate. Torque will be consequently transmitted from the roller 73 onto the surface 59. The track which the roll RI will describe on surface 59 is called a thochoide. In this special case, it is an extended epicycloide. It will thus be seen that because of the swivelling of the rollers, an angular motion of surface 59 in the counterclockwise direction has been achieved and that torque has been transmitted from the rollers 73 to surface 59.

Figure 17:
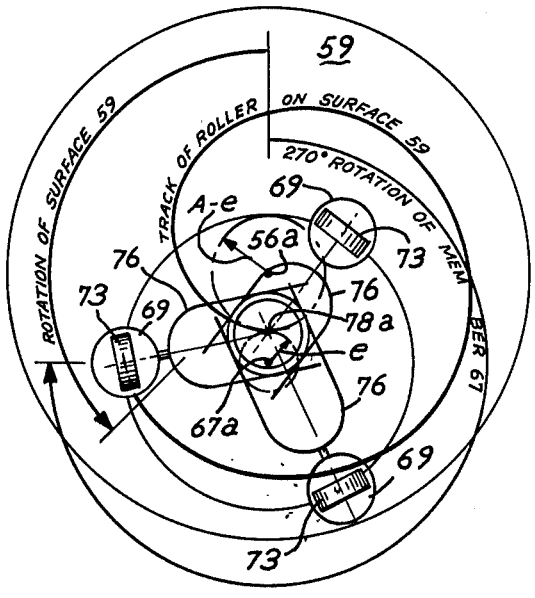
Figure 18:
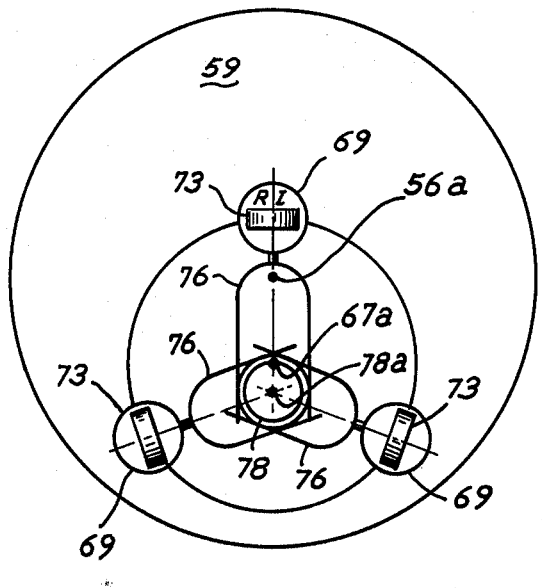
FIGS. 18–21 illustrate a cycle of operation of a greatly simplified version of the improved friction gear of the present invention when the guiding surface is in a third position.
Figure 19:
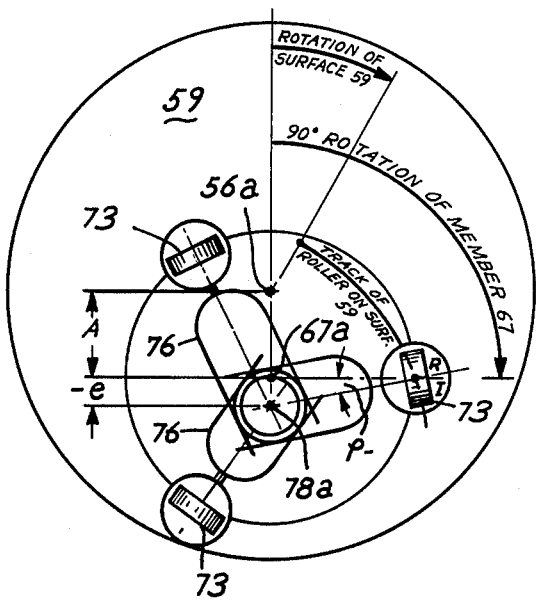

FIG. 15 shows the position of the components after 180° of rotation of the member 67 and the further track of roll RI on surface 59. A further rotation of surface 59, in a counterclockwise direction, has occured. FIG. 17 shows the position of the components after 270° of rotation of the member 67 and the further track of roll RI on surface 59. A further rotation of surface 59 in counterclockwise direction has occured. In this regard, if the distance between the center lines 56a and 57a of shaft 56 and 57 is defined as "A" and if the distance of the center line 78a of the guiding surface 78 and center line 57a of shaft 57 is defined as "e", then the ratio can be found with the equation $r = (A-e)/e$. It can be visualized that the distance "e" is the radius of a pitch circle of an imagined wheel, whereas, the distance $A-e$ the radius of a pitch circle of another imagined wheel. These two imagined pitch circles touch in a point which lies on the center line, 78a, of the guiding surface 78. In summary the center line 78a of the guiding surface 78 in FIGS. 14-17 is positioned between the center lines 56a and 57a of the shafts 56 and 57. In these FIGURES, a ratio of approximately 2:1 exists. The friction gear moves therefore under the same conditions as if two gears with the ratio 1:2 are working together. This means that when member 76 is moving clockwise, surface 59 is moving counterclockwise. It has to be remembered that the surface 59 is moved and torque can be transmitted. The rollers 73 will only roll on the surface and no axial transition from the rollers of the surface will occur. This fact is shown the experts opinion of Prof. Dr.-Ing. Gerd Kieper on his examination dated Nov. 27th, 1970, a copy of which opinion was filed in my application Ser. No. 464,908. Apart from this expert opinion a prototype of this friction gear has been constructed and its operation is as described above. FIGS. 18-21 show the position of the components during one revolution of member 67, when the guiding surface 78 has been shifted in opposite direction. In other words, the center line 78a of the surface 78 is now positioned on an extension of the plane which is defined by the center lines 56a and 57a of shafts 56 and 57, i.e., the center line 78a is not positioned between the center lines 56a and 57a but outside the center line 57a of shaft 57. FIG. 18 shows the position of the components at the start of the cycle. FIG. 19 shows shows the position of the components after 90° of rotation of the member 67. It is important to note that the arms 76 guide the rollers 73 positively in such a way that the center of curvature of the tracks which the rollers are describing on surface 59 are always identical with the center line 78a of the surface 78. It can be seen from FIG. 19 that the roll R I has now an angle of inclination (or better angle of swivel) which is called $-\phi$. It can also be seen that the angle $-\phi$ is directed to the opposite direction. Consequently the roll R I is now being swivelled or rotated in the other direction than as shown in FIG. 15. As a consequence of this fact, a component of motion of the roll R I will cause the surface 59 to rotate. Torque will consequently be transmitted from the rollers 73 onto the surface 59. Because this component of the motion now has another direction the surface 59 will rotate, but in a direction opposite to that shown in FIG. 15. The track which the roll R I will describe on surface 15 is called a trochoide. In this special case, it is an extended hypocycloide.

Figure 20:
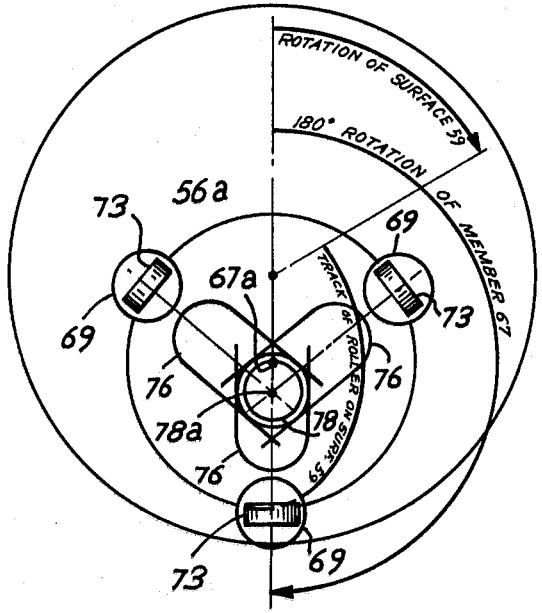
Figure 21:
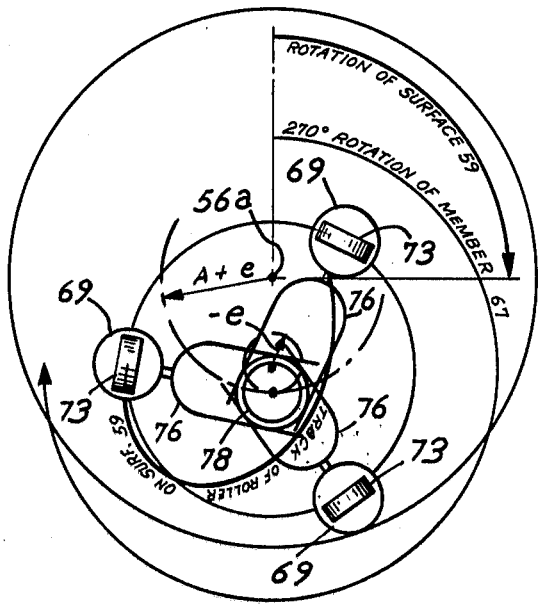

FIG. 20 shows the position of the components after 180° of rotation of the member 67 and the further track of roll R I on surface 59. Further rotation of surface 59, in the same direction, has occurred. FIG. 21 shows the position of the components after 270° of rotation of the member 67 and the further track of roll RI on surface 59. Still further rotation of surface 59, in the same direction, has occurred.

As far as the ratio is concerned, the same remarks as noted above with respect to the FIGS. 14-17 arrangement, apply to this FIGS. 18-21 arrangement. However, because the distance "e" is now in the opposite direction, the amount will be negative. The equation for the ratio is now $r = (A-(-e))/e = (A+e)/e$. It can be visualized that the distance $(-e)$ is the radius of a pitch circle of an imagined wheel; whereas, the distance $(A+e)$ the radius of a pitch circle of another imagined wheel. These two imagined pitch circles touch in a point in which also the center line 78a of the guiding surface 78.

As shown in FIGS. 18-21, the center line of the guiding surface 78 is shifted in the opposite side to that shown in FIGS. 14-17, and the gear shown in FIGS. 18-21 has a ratio of approximately 1:3 whereby both driving and driven shaft are moving in the same direction. The friction gear operates now like a gear whereby the planetary gear (wheel toothed outside) is in a planetary wheel (toothed inside), i.e. both the driving and driven shafts are moving in the same direction.

In conclusion, it is submitted that the foregoing descriptions of the cinematic conditions of the friction gear are sufficiently explained. In this regard, it must be remembered that the above noted expert opinion of Prof. Dr.-Ing. Gerd Kieper deals very thoroughly with this aspect, especially with the fact that the rollers 73, in fact, really only roll and that no axial slipping occurs. Prof. Dr.-Ing. Gerd Kieper's opinion has been confirmed by the operation of a prototype of my improved friction gear.

Apart from the foresaid, another simplified explanation may be helpful in understanding the operation of my improved friction gear. First, imagine two toothed wheels, arranged as indicated in FIG. 17. Connect surface 59 onto the wheel with the pitch circle radius of "A-e". Connect the other tooth wheel, with the pitch circle radius "e", to the member 67. Substitute pencils for the rollers, with the tips of the pencils touching the surface 59. If you turn one wheel, the other wheel is also being driven. Then the pencil tips will draw certain tracks on the surface 59. These tracks are the foresaid cycloides, in this case extended epicycloides.

If you apply the same procedure with the wheels as shown in FIG. 21, then a slightly different condition exists, because other pairs of wheels are in question. Consequently the tips of the pencils will describe different racks, also cycloides, but in this case, extended hypocloides. The point of curvature of these tracks are always the points where the pitch circles touch each other. Substitute now rollers for the pencil tips as shown and force these rollers to follow exactly these pencil tracks. The rollers have the characteristic to run only in a tangentional direction, but this characteristic is blocked in axial direction by the positive guiding of the arms 76 which cause the rollers to follow the pencil track. The arms 76, in turn, are positively guided by the guiding surface 78. For any position of the guiding surface 78, corresponding cycloides do exist and therefore corresponding ratios. Because the position of the part 79 may be varied, a variable mechanical drive friction gear is described.

Since the invention disclosed herein may be embodied in other specific forms without departing from the spirit or the general characteristics thereof, the embodiments described herein are therefore to be considered in all respects as illustrative and not restrictive, the scope of the invention being indicated by the appended claims, rather than by the foregoing descriptions; and all changes which come within the meaning and range of equivalency of the claims are therefore intended to be embraced therein.

What is claimed is:

1. An improved friction gear, with an infinitely variable transmission ratio, comprising:
    a first shaft having an end and having a central, longitudinal axis about which it rotates;
    a second shaft having an end and having a central, longitudinal axis about which it rotates;
    means for supporting the first and second shafts for rotation so that relative movement between the rotational axes of the first and second shafts is prevented, so that the rotational axis of the second shaft is parallel to but offset from the rotational axis of the first shaft, and so that the end of the first shaft is adjacent to and faces the end of the second shaft;
    an axial bearing surface means mounted on the end of the first shaft such that the bearing surface means is disposed adjacent to the end of the second shaft and in a first plane which is substantially perpendicular to the rotational axes of the first and second shafts;
    at least two roller means, with each roller means having an axis about which it rotates;
    means for mounting the roller means on the end of the second shaft adjacent to the bearing surface means so that the roller means run on the surface of the bearing surface means;
    axially symmetrical guiding surface means having a central longitudinal axis;
    means interconnecting the mounting means and the guiding surface means for aligning the roller means so that the axes of the roller means are directed towards a straight line which extends parallel to the rotational axes of the first and second shafts, which lies in a second plane defined by the rotational axes of the first and second shafts and which is coaxial with the longitudinal axis of the guiding surface means; and
    means for changing the transmission ratio including means for moving the guiding surface means so that its longitudinal axis is moved in a direction perpendicular to the rotational axes of the first and second shafts in the second plane.

2. The improved friction gear described in claim 1 which includes a cylindrical element which is mounted on the second shaft for rotation therewith and which has a central longitudinal axis that is parallel to the rotational axes of the first and second shafts; wherein the roller means are mounted in journals which, in turn, are mounted in the cylindrical element in a circle about axes of the cylindrical axis.

3. The improved friction gear described in claim 2 wherein an arm extends between and interconnects each journal and the guiding surface.

4. The improved friction gear described in claim 3 wherein the portion of the arms adjacent to the guiding surface means are relatively flat; wherein the arms are arranged in close juxtaposition along the guiding surface means in the direction of the axis of the guiding surface means.

5. The improved friction gear described in claim 2 wherein the bearing surface means includes a disc mounted for displacement axially on the first shaft and is biased in the axial direction towards the end of the second shaft.

6. The improved friction gear described in claim 2 wherein the means for aligning the roller means includes sliding members which are mounted on the journals and which extend parallel to the rotational axes of the roller means; wherein each sliding member is guided in a first generally radial groove which is formed in an arcuate link; wherein the guiding surface means includes a second annular groove; and wherein a portion of the arcuate links are guided in the second groove.

7. The improved friction gear described in claim 2 wherein the means for aligning the roller means includes angle-shaped arms; wherein each of the arms has an end which is connected with a journal; wherein the guiding surface means includes an annular member that has an external cylindrical guiding surface; wherein a first free end of the arm is in sliding contact with the guiding surface; and wherein the annular member is adjustably displaceable in a direction perpendicular to the rotational axes of the first and second shafts in the second plane.

8. The improved friction gear described in claim 7 wherein the angle-shaped arms each have a second free end which contacts the guiding surface at a point diametrically opposite from the point of contact between the first free end and the guiding surface.

9. The improved friction gear described in claim 1 wherein the bearing surface means includes a bearing surface which consists of an axially yieldable surface.

10. The improved friction gear described in claim 9 wherein the yieldable surface is formed of a plurality of axially aligned, closely juxtapositioned pins mounted in a rubber-like bearing layer.

11. The improved friction gear described in claim 10 wherein the pins are positioned and held between a plurality of radial webs.

12. The improved friction gear described in claim 11 wherein the bearing surface means includes a bearing surface; and wherein the rotational axes of the roller means are inclined with respect to the longitudinal central axes of the guiding surface means and to the bearing surface.

13. The improved friction gear described in claim 12 wherein the roller means includes rollers having bearing surfaces that are conical so as to correspond to the inclination of the rotational axes of the roller.

14. The improved friction gear described in claim 1 wherein the bearing surface means includes first and second, substantially axial, facing bearing surfaces; wherein the roller means includes pairs of axially aligned rollers disposed between the facing bearing surfaces; wherein one roller of each pair of rollers bears on the first bearing surface and the other roller of each pair of rollers bears on the second bearing surface; and wherein the one roller bears against the other roller of each pair of rollers so that the pressure applying forces of the rollers in each pair of rollers are cancelled.

15. The improved friction gear described in claim 14 wherein the first bearing surface is the surface of a first disc mounted on the first shaft; wherein the second bearing surface is the surface of a second disc; wherein the second disc is connected to a cylindrical part; wherein the cylindrical part is connected to a ring which is disposed adjacent to the side of the first disc opposite to first bearing surface; and wherein means are disposed between the ring and the first disc for interconnecting the ring and the first disc.

16. The improved friction gear described in claim 14 wherein each pair of rollers are movably guided in a direction generally perpendicular to the planes of the first and second bearing surfaces; and wherein the rollers in each pair of rollers roll one upon the other at a point remote from the points of bearing contact between the rollers and the bearing surfaces.

17. The improved friction gear described in claim 16 wherein each pair of rollers is supported in a mounting disposed in an opening formed in a member attached to and carried by the second shaft; and wherein the mountings and the openings include complementary guide surfaces which permit the mountings to slide in the openings.

18. The improved friction gear described in claim 17 wherein the guide surfaces are rectangular in cross-section.

19. The improved friction gear described in claim 17 wherein a journal is rotatably mounted in each opening; wherein the journal includes the complementary guide surfaces; and wherein the mountings are disposed non-rotatably within the journals.

20. The improved friction gear described in claim 19 wherein the rotational axes of the pair of rollers intersect the longitudinal axis of the journal in which the pair of rollers are mounted.

21. The improved friction gear described in claim 13 wherein the transverse axis of each roller in a pair of rollers is inclined with respect to the adjacent bearing surface and with respect to the transverse axis of the other roller in the pair of rollers; wherein the surfaces of the rollers in a pair of rollers which bear on the first and second bearing surfaces are different from the surfaces of the rollers which bear on one another.

22. The improved friction gear described in claim 16 wherein the transverse axis of each roller in a pair of rollers is inclined with respect to the adjacent bearing surface and with respect to the transverse axis of the other roller in the pair of rollers; wherein the surfaces of the rollers in a pair of rollers which bear on the first and second bearing surfaces are different from the surfaces of the rollers which bear on one another.

23. The improved friction gear described in claim 2 wherein the surfaces of the rollers, in a pair of rollers, which bear on one another have a first conical shape; and wherein the surfaces of the rollers which bear on the first and second bearing surfaces have a second conical shape.

* * * * *